(12) United States Patent
Umezawa et al.

(10) Patent No.: US 7,014,770 B2
(45) Date of Patent: Mar. 21, 2006

(54) FILTERING METHOD OF A COLLOIDAL SOLUTION

(75) Inventors: Hiroyuki Umezawa, Ota (JP); Masahiro Iseki, Ota (JP); Motoyuki Tsuihiji, Ota (JP); Hirofumi Iinuma, Ora-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 56 days.

(21) Appl. No.: 10/439,309

(22) Filed: May 16, 2003

(65) Prior Publication Data

US 2004/0016705 A1     Jan. 29, 2004

(30) Foreign Application Priority Data

May 17, 2002  (JP)  ............................. 2002-143780

(51) Int. Cl.
*C02F 1/52* (2006.01)
(52) U.S. Cl. ...................... 210/636; 205/500; 205/747; 210/638; 210/639; 210/721; 210/724; 210/748; 210/754; 210/756; 210/778; 210/791; 210/903
(58) Field of Classification Search ................ 210/636, 210/638, 639, 721, 724, 725, 738, 748, 754, 210/756, 903, 778, 791; 205/411, 500, 747
See application file for complete search history.

(56) References Cited

U.S. PATENT DOCUMENTS

| | | | | |
|---|---|---|---|---|
| 4,313,830 | A | * | 2/1982 | Tulin et al. ................. 210/639 |
| 5,269,934 | A | * | 12/1993 | Dubrovsky et al. ......... 210/651 |
| 5,965,027 | A | * | 10/1999 | Allen et al. ................. 210/638 |
| 6,258,277 | B1 | * | 7/2001 | Salmen et al. .............. 210/638 |
| 6,511,602 | B1 | * | 1/2003 | Miyashita et al. .......... 210/636 |
| 6,582,605 | B1 | * | 6/2003 | Krulik et al. ............... 210/638 |
| 6,589,396 | B1 | * | 7/2003 | Kuriyama et al. ..... 204/157.15 |
| 6,607,670 | B1 | * | 8/2003 | Baldwin et al. ............ 210/714 |
| 6,830,679 | B1 | | 12/2004 | Tsuihiji et al. |
| 2003/0094426 | A1 | | 5/2003 | Umezawa et al. |
| 2003/0095894 | A1 | | 5/2003 | Umezawa et al. |

* cited by examiner

*Primary Examiner*—Peter A. Hruskoci
(74) *Attorney, Agent, or Firm*—Morrison & Foerster LLP

(57) ABSTRACT

A filtering method is directed to a wastewater of CMP process, which includes sub-micrometer particles suspended as colloid. The wastewater is filtered by a gel membrane formed on a surface of plastic filter. A coagulant or a pH adjuster is added to the wastewater so that the sub-micrometer particles are coagulated to form the gel membrane.

29 Claims, 13 Drawing Sheets

FILTERING METHOD OF A COLLOIDAL SOLUTION

BACKGROUND OF THE INVENTION

1. Field of the Invention

The invention relates to a filtration method of colloid solution, specifically to a filtration method of a colloidal solution containing very fine substances having diameters less than 0.15 $\mu$m.

2. Description of the Related Art

It is critical for corporations operating in the 21 st century to reduce industrial wastes, to classify industrial wastes so that wastes can be recycled and not to release industrial wastes into the environment from an ecological standpoint.

Although various terms are employed to denote aqueous wastes such as sewage, wastewater and wastes, all aqueous and chemical solutions containing substances that require removal will hereinafter be generally called wastewater. The substances are generally removed from wastewater by expensive filtration devices so that the wastewater can be reused and that the separated substances or filter out substances are treated as industrial wastes. Water cleaned to satisfy environmental regulations by filtration is returned to natural environments such as rivers and seas, or reused.

However, due to the cost of filtration and associated running costs, it is very difficult to adopt these devices, which results in environmental problems.

As can be understood from the above, wastewater treatment technology is a very important issue from the standpoint of both environmental protection and resource recycling. The system with low initial cost and low running cost is keenly desired.

As an example, wastewater treatment in the semiconductor manufacturing field will be discussed below. In grinding a plate-like object made of metals, semiconductors, and ceramics, liquids such as water are showered over grinding jigs and the plate-like object in order to prevent temperature rises in grinding jigs, improve lubricity, and prevent grinding swarfs and machining chips from adhering to the plate-like object.

A typical practice is to use pure water for the shower in dicing or back-grinding semiconductor wafers, i.e., plate-like semiconductor members. On a dicing device, the showering is performed by forming a flow of pure water over semiconductor wafers or arranging a water nozzle to eject pure water on the semiconductor wafer in order to prevent temperature increase in the dicing blade or dicing chips from adhering onto the wafer. In thinning the thickness of the wafer by back-grinding, pure water is also used for the same reason.

Wastewater contaminated with grinding swarfs or polish swarfs discharged from a dicing device or back-grinding device is cleaned by filtration before it is returned to the environment, while wastewater concentrated as a result of reuse is collected.

As for the current semiconductor manufacturing process, the method of treating wastewater containing substances (debris) made mainly of Si can be divided into two methods, i.e., a coagulating precipitation method and a method of combining filtration and centrifugation.

In the coagulating precipitation method, coagulants such as PAC (poly aluminum chloride) and $Al_2(SO_4)_3$ (aluminum sulfate) are mixed with the wastewater to cause reactions with Si, and reactants thus formed are removed as a means of filtration.

In the latter method in which filtration is combined with centrifugation, the wastewater is first filtrated to produce a condensate, which is then centrifuged to remove silicon debris as sludge, producing cleaned water to be returned to the environment or reused.

For example, as shown in FIG. 12, the wastewater generated during the dicing process is collected into a raw water tank 201 and fed to a filtration device 203 via pump 202. Filtration device 203 is equipped with a ceramic type or organic type filter F, so that the filtered water is fed to a collection water tank 205 via piping 204 to be reused or released into the environment.

In the meantime, the filter F of filtration device 203 eventually becomes clogged so that it is periodically cleaned. For example, a valve B1 on the raw water tank 201 side is closed while opening a valve B2 and a valve B3 to clean the filter F with the water reverse-fed from collection water tank 205. The wastewater thus generated containing a high concentration of Si debris is returned to raw water tank 201. The concentrated water from a concentration tank 206 is fed to a centrifuge 209 via pump 208 and is separated into sludge and separation liquid by centrifuge 209. The sludge mainly made of Si debris is collected in sludge collection tank 210 and the separated liquid is collected into a separation liquid tank 211. The wastewater from separation liquid tank 211 which collects the separation liquid is fed to raw water tank 201 via pump 212.

These methods are also used for collecting debris generated during the process of grinding bulky solids or a plate-like object made primarily of metals such as Cu, Fe, and Al, or bulky solids or a plate-like object made primarily of inorganic substances such as ceramics.

CMP (chemical-mechanical polishing) is a newly introduced semiconductor processing technology.

The CMP technology provides the following features:

(1) Realization of a flatter device surface.

(2) Realization of a structure embedded with a material different from the substrate.

Feature (1) allows microscopic patterns to be accurately formed using lithographic techniques. When combined with the Si wafer pasting technique, it also allows realizing three dimensional ICs.

Feature (2) allows embedded structures. For the multi-layer wiring of ICs, the tungsten (W) embedding technique has been used. This method is to embed tungsten into grooves formed in interlayer films by the CVD method, which is then flattened by etching back the surface. More recently, it is flattened by the CMP method. The application of this embedding technique includes the Damascene process and element separation.

The CMP technology and its applications are described, for example, in "CMP Science" published by Science Forum.

The CMP mechanism will be described briefly. As shown in FIG. 13, a semiconductor wafer 252 is placed on a grinding cloth 251 carried on a rotating platen 250 to lap, grind and chemical etch together while pouring abrasive (slurry) 253 to remove structures associated with the surface roughness of wafer 252. The chemical reaction due to the solvent contained in abrasive 253 and the mechanical grinding action due to the grinding cloth and the abrasive grinding stones contained in the abrasive provides planarization function. Grinding cloth 251 can be foamed polyurethane, unwoven fabrics, and the like, while the abrasive can be abrasive grinding stones such as silica and alumina mixed with water containing pH adjusters, and is normally called slurry. Wafer 252 is lapped against grinding cloth 251 by rotating it and applying a certain pressure, while pouring slurry 253. A dressing unit 254 is provided to constantly redress grinding cloth 251 to maintain the grinding capability of grinding cloth 251. The drawing also shows motors 202, 208 and 212 as well as belts 255, 256 and 257.

The above mechanism is constructed as an integrated system as shown in FIG. 14. The system can be divided primarily into a wafer cassette loading/unloading station 260, a wafer transfer mechanism unit 261, a grinding mechanism unit 262 as described in FIG. 13, a wafer cleaning unit 263, and a system controller that controls all of the above.

A cassette 264 carrying at least one wafer is placed on wafer cassette loading/unloading station 260, where a wafer carried by cassette 264 is taken out. Next, wafer transfer mechanism unit 261, for example, a manipulator 265, holds the wafer, and places it on rotating platen 250 provided in grinding mechanism unit 262 so that the wafer can be planarized by the CMP technology. When the planarization process is finished, the wafer is transferred to wafer cleaning unit 263 by manipulator 266 to be cleaned. The cleaned wafer is returned to wafer cassette 266 to be stored.

The amount of slurry used for one cycle is typically about 500 cc to one liter/wafer. In addition, pure water is consumed in grinding mechanism unit 262 and wafer cleaning unit 263. All of these liquids are finally joined at the drain, and wastewater of approximately 5 to 10 liters/wafer is discharged per each planarization process. In the case of a triple layer metal, a total of seven planarization processes are performed for planarizing the metals and interlayer insulation films, generating seven times as much waste (7×5–10 liters) before one wafer is completed.

Thus, a large amount of slurry diluted by pure water is discharged when the CMP device is used. This wastewater has been treated by the coagulating precipitation method because the wastewater is a colloidal solution.

However, the coagulating precipitation method uses chemicals as coagulants. It is very difficult to estimate the right amount of chemicals for a complete chemical reaction, thus an excessive amount of chemicals is loaded and the chemicals remain unconsumed at the end. On the other hand, if the amount of chemicals is not sufficient, some substances remain in the solution. If the amount of chemicals is excessive, the chemicals remain in the supernatant liquid. If such wastewater is intended to be reused, the chemicals remaining in the filtered liquid present a problem that they cannot be used for any application that prohibits inclusion of chemicals.

Flocks that are reactants of chemicals and substances look like and float like seaweed. The condition for forming flocks is attained by a severe pH control and requires an agitator, a pH measuring device, a coagulant injection device and a control device to control the process. In order to stabilize flocks and allow them to precipitate, a large settling tank is necessary. For example, to achieve a 3 cubic meter ($m^3$)/hour treatment capacity, a tank with a 3 meter diameter and a 4 meter depth (a settling tank of an approximately 15 ton capacity) is required, which in turn requires a substantial space of approximately 11×11 meters to install the entire system.

Moreover, some of the flocks remain floating without precipitating, and are more likely to flow out of the tank, and it is difficult to collect all of them. Thus, the system is subject to problems such as a large system size, high initial cost, difficulty in water reuse and high running cost due to the use of chemicals.

On the other hand, a combination system of filtration and centrifugation with a 5 cubic meter ($m^3$)/hour treatment capacity as shown in FIG. 12 uses a filter F (a filter called an UF module using a polysulfone type fiber or a ceramic filter) for filtration device 203 so that water reuse is possible. However, since filtration device 203 requires four filters F that have a short life, it is necessary to replace four of these expensive filters, each costing approximately 500,000 yen, at least once a year. Moreover, pump 202 placed ahead of filtration device 203 tends to develop clogging, causing a high load on the motor, since the filter F is based on a pressurized type filtration method. Thus, pump 202 requires a high capacity. Furthermore, approximately two thirds of the wastewater that passes through the filter F is returned to raw water tank 201. The wastewater that contains substances attacks the inner walls of pump 202 that feeds the wastewater so that the life of pump 202 is shortened considerably.

In summary, the problem with this method is an extremely high running cost due to high electric power consumption and replacements of the pump P and the filter F.

Furthermore, CMP consumes an amount of wastewater much higher than the dicing process. The slurry is distributed in the fluid in a colloidal state and does not subside easily due to its Brownian movement. In addition, the particle size of abrasive grinding stones mixed in the slurry is as fine as 10–200 nm in diameter. Therefore, if the slurry including such fine particles is filtered using a filter, the pores of the filter become very quickly loaded with abrasive grinding stones, causing clogging often and making it difficult to process a large amount of wastewater.

As can be seen from the above explanation, the filtration device for wastewater used for removing substances that affect the global environment or for reusing filtered fluids or separated substances is often a substantial system of a high initial and running costs. Therefore, these conventional wastewater treatment devices are hardly useful in practical applications.

It has been a general belief that a filter membrane having pores smaller than sub-micrometer particles is required in order to remove the sub-micrometer particles of 0.15 $\mu$m or smaller, such as abrasive grinding stones contained in CMP slurry. However, since such a filter does not exist, a common knowledge has been that it is impossible to filter such a liquid.

SUMMARY OF THE INVENTION

The invention provides a method of filtering a colloidal solution containing colloidal substances. The method includes providing a first filter in the colloidal solution, adding an additive to the colloidal solution so that the colloidal substances are coagulated in the colloidal solution, sucking the colloidal solution through the first filter so that the coagulated colloidal substances are accumulated on a surface of the first filter to form a gel membrane, and filtering the colloidal solution using the gel membrane as a second filter formed on the first filter.

The invention also provides a method of filtering a colloidal solution containing colloidal substances. The method includes providing a first filter in the colloidal solution, adding an additive to the colloidal solution so that the colloidal substances are coagulated in the colloidal solution, and sucking the colloidal solution through the first filter so that the coagulated colloidal substances are accumulated on a surface of the first filter to form a gel membrane. The method also includes filtering the colloidal solution using the gel membrane as a second filter formed on the first filter until the second filter clogs, removing at least a part of the clogged second filter, and repeating the adding, the sucking and filtering.

The invention further provides a method of filtering a CMP slurry containing colloidal substances and ammonium. The method includes providing a first filter in the colloidal solution, adding hypochlorous acid or sodium hypochlorite to the CMP slurry so as to decompose the ammonium and to change pH of the CMP slurry, sucking the CMP slurry through the first filter so that coagulated colloidal substances are accumulated on a surface of the first filter to form a gel membrane, and filtering the CMP slurry using the gel membrane as a second filter formed on the first filter.

DETAILED DESCRIPTION OF THE INVENTION

First, the terms used in describing this invention are described. A colloidal solution is a solution in which fine particles having diameters ranging from 1 nm to 1 $\mu$m are dispersed. These particles are subject to the Brownian motion and are capable of passing through regular paper filters but not semipermeable membranes. The slow coagulation speed of the colloidal particles is due to the electrostatic forces between the particles, which prevent the particles from contacting.

The term sol is used as nearly synonymous with a colloidal solution. Different from a gel, sol is dispersed in a liquid, presents fluidity, and is subject to the Brownian motion.

A gel is a state where colloidal particles have lost mobility and become rigid. For example, agar and gelatin become sol when they are dissolved in warm water, but lose fluidity and become a gel when they are cooled. Gels can be divided into hydrogel that contains a large amount of fluid and xerogel that is dry.

A sol can be gelated by removing water, which is a medium fluid, or adjusting the pH to a level of pH 6–7 by adding an electrolyte salt to silica slurry (pH 9–10), or cooling it to lose fluidity.

A slurry is a colloidal solution or sol used in the polishing process made by mixing liquids and chemicals. The colloidal solution used in the CMP process is called CMP slurry. The most recognized CMP slurries are a silica-based abrasive, an aluminum-oxide (alumina)-based abrasive, and a cerium-oxide (ceria)-based abrasive. The abrasive used most often is the silica-based abrasive, among which colloidal silica is the most popular one. The colloidal silica is a dispersion liquid where ultra fine silica particles in a size range of 7–300 nm are homogenously dispersed in water or organic media without sedimentation and is called silica sol. This colloidal silica does not sediment even after one year due to mutual repulsion forces of the colloidal particles as it is a monodisperse system of particles in water.

The invention is directed to a filtration method of colloidal solution to remove substances from wastewater containing those substances in a colloidal state or a sol state in a liquid.

The colloidal solution for the filtration contains a large amount of substances that are fine particles in a diameter range of 3 nm to 2 $\mu$m, such as abrasive grinding stones, e.g., silica, alumina or ceria used in CMP and semiconductor debris, metal debris and/or debris of insulation membrane materials. In the embodiments of this invention, ILD 1300 slurry for grinding oxide films, a product of Rodel Nitta Company, was used as the CMP slurry. This slurry is an ammonia-based slurry of pH 10, including silica suspension in a diameter range of 10 to 200 nm. Due to its strong alkalinity, it presents a strong resistance against gelation.

Figure 1:
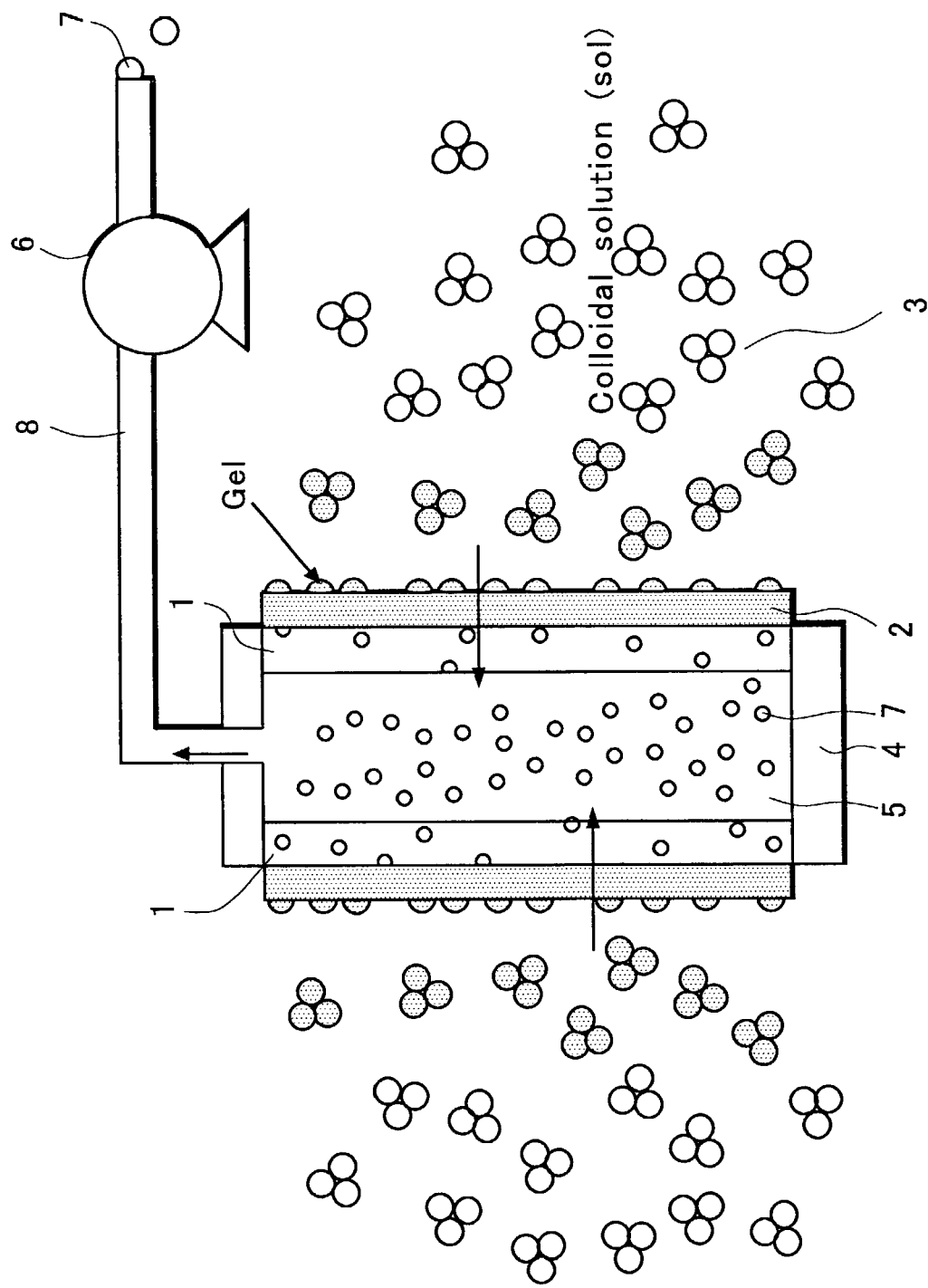
FIG. 1 is a schematic diagram of a filter used in a filtering method according to a first embodiment of the invention.

FIG. 1 shows an embodiment of this invention. In this embodiment, the colloidal solution (wastewater) containing substances if filtered using a filter that is a gel membrane made of the substances. Specifically, a gel membrane is formed on a surface of a first filter 1 made of organic polymers, and these filters 1 and 2 are used together to filter the colloidal particles suspended in a liquid 3. The feature of the embodiment is to cause the substances to form sol particles larger than the original sol particles in order to promote gelation with the help of coagulants or pH adjusters added in advance.

First filter 1 can be either an organic polymer or ceramic as long as the gel membrane can be adhered. A polyolefin-based polymer member having an average pore diameter of 0.25 $\mu$m and a thickness of 0.1 mm is used. The surface photograph of this polyolefin-based filter membrane is shown in FIG. 2B.

The first filter 1 has a flat membrane structure provided on both sides of a frame 4 and is immersed perpendicular to the flow. The filtrate 7 can be extracted from a chamber 5 of frame 4 by a pump 6.

Second filter 2 is a gel membrane formed on the entire surface of first filter 1 by attracting coagulated sol particles of the substances, thus readily forming a gel. Since the gel membrane is in a jelly state, the common belief is that it does not have any filtration capability. However, it was found that a proper selection of the gel membrane forming condition enables second filter 2 to have a filtration capability. This formation condition will be described later.

Figure 2A:
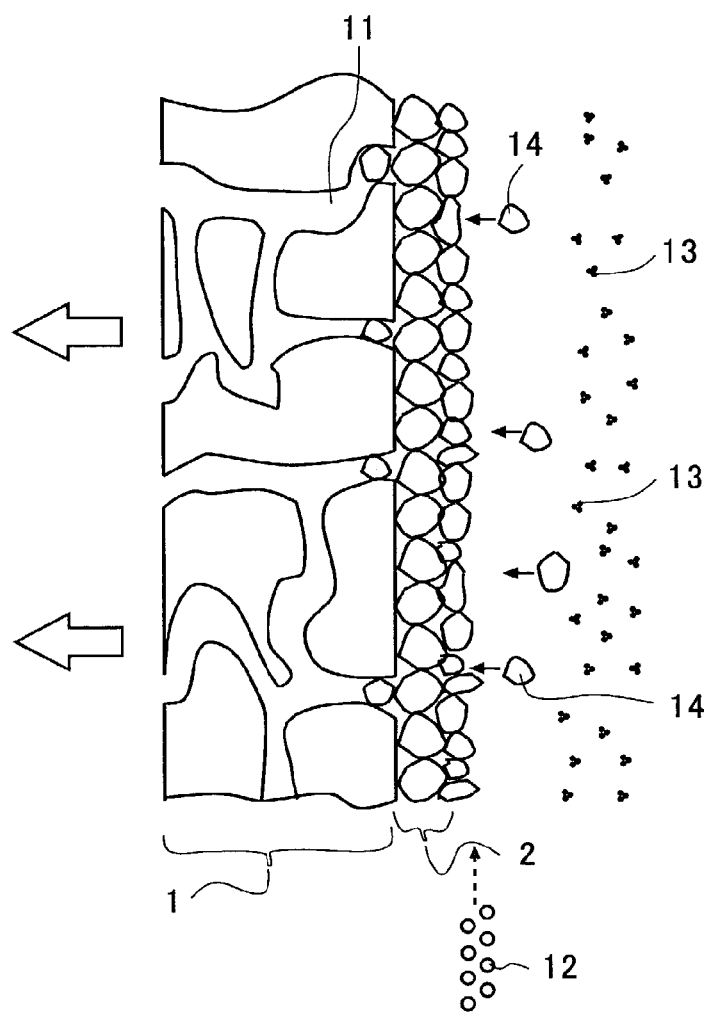
FIG. 2A shows the operating principle the first and second filter structure of the first embodiment.
Figure 2B:
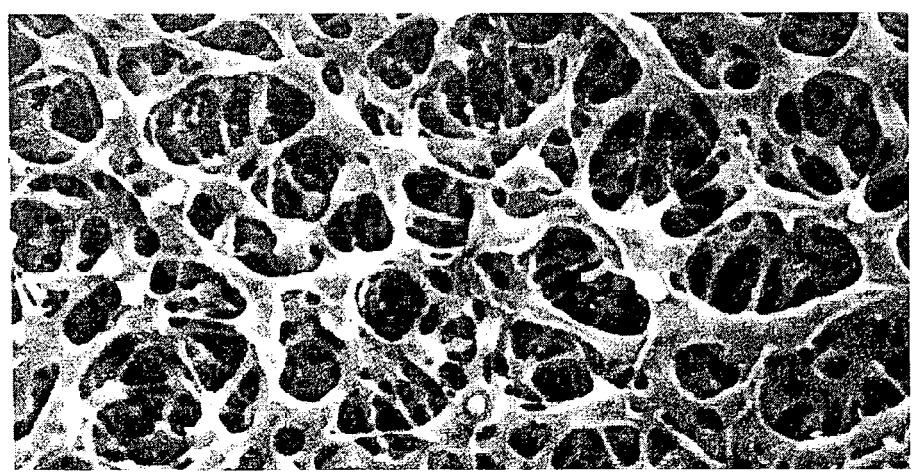
FIG. 2B is a photograph of the first filter.

The process of forming second filter 2 with the substances using the colloidal solution (sol) of the substances and the filtration process of removing the substances are described, referring to FIG. 1 and FIG. 2A. First, a coagulant or a pH adjuster is added into the liquid (wastewater) containing the substances in a colloid solution (sol) state. The coagulant or the pH agent has the function of weakening the repulsive force of static electricity that is present in the sol particles in order to allow the sol particles to become coagulated to form larger coagulated particles. In the case of a colloidal solution of the substances, which is easy to be gelated, it is particularly advantageous to promote gelation by a coagulant or a pH adjuster, as gelation assists filtration in the next filtration process. In other words, although these larger sol particles have not lost fluidity inherent with sol and are not yet gelated at this point, they are ready to become gelated. Although large sol particles are shown as a combination of three particles in FIG. 1, the number of particles is just for illustrative purposes. It simply indicates that the repulsive forces of sol particles of approximately 20 nm in diameter are weakened by a coagulant or pH adjuster to form coagulated sol particles of approximately 100 nm.

The amount of coagulant to be added should not be the amount so as to cause gelation to generate flocks, which sediment by their own weight, but rather the amount only sufficient for sol particles to form larger sol particles. The amount of pH adjuster to be added should be sufficient to adjust the pH value to substantially neutral, i.e., 6–7. Its purpose is to promote gelation by weakening the repulsive force of sol particles. As for the coagulants in this case, conventional coagulants such as PAC (poly aluminum chloride) and $Al_2(SO_4)_3$ (aluminum sulfate) can be used. As for the pH adjusters, HCl (hydrochloric acid) and NaOH (sodium hydroxide) can be used.

First filter 1 has a plurality of filtration pores 11. The second filter is the gel membrane made of substances 13 formed in layers around the openings of filtration pores 11 on the surface of first filter 1. The coagulated particles 13 are ready for gelatinization due to a coagulant or a pH adjuster. These coagulated particles are subject to a suction pressure provided by the pump via first filter 1, so that they lose water of the liquid 3, become dry (dehydrated), and are quickly gelated to form second filter 2 on the surface of first filter 1.

Since second filter 2 is made of the coagulated particles of substances 13, it quickly reaches the intended film thickness, and the filtration of the coagulated particles in the colloidal solution using this second filter 2 starts. As the filtration is continued with a pump 6 providing the suction pressure, the gel membrane made of the coagulated particles on the surface of second filter 2 continue to grow thicker and eventually clog up second filter 2, making it unable to continue filtration. In the meanwhile, the coagulated particles of the substances are gelated and adhere to the surface of second filter 2 and the wastewater passes through first filter 1 to be discharged as the filtered water.

In FIG. 2A, the colloidal solution containing the substances, colloidal particles, is on the right side of first filter 1, while the filtered water that has passed through first filter is on the left side of first filter 1. The wastewater is suctioned in the arrow direction. As the coagulated particles in the colloidal solution approach first filter 1 due to the suction, they lose the electrostatic repulsive force, and multiple coagulated particles are combined to form gelated particles, which in turn form a gel membrane on the surface of first filter 1 as second filter 2. Second filter 2 promotes the gelation of the substances in the colloidal solution, which results in the filtration of the wastewater. The filtered water is suctioned from the left side of first filter 1.

Thus, by slowly suctioning the wastewater in a colloidal solution state through second filter 2, the water contained in the wastewater is obtained as the filtered water, while the substances are dried and gelated to be accumulated on the surface of second filter 2, and the coagulated particles of the substances are captured in the gel membrane.

Figure 3A:
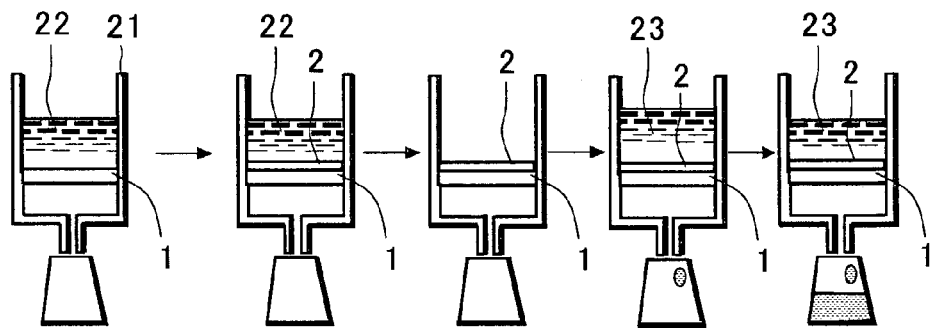
FIG. 3A shows a sequence of the formation of the second filter and the filtration using the second filter.
Figure 3B:
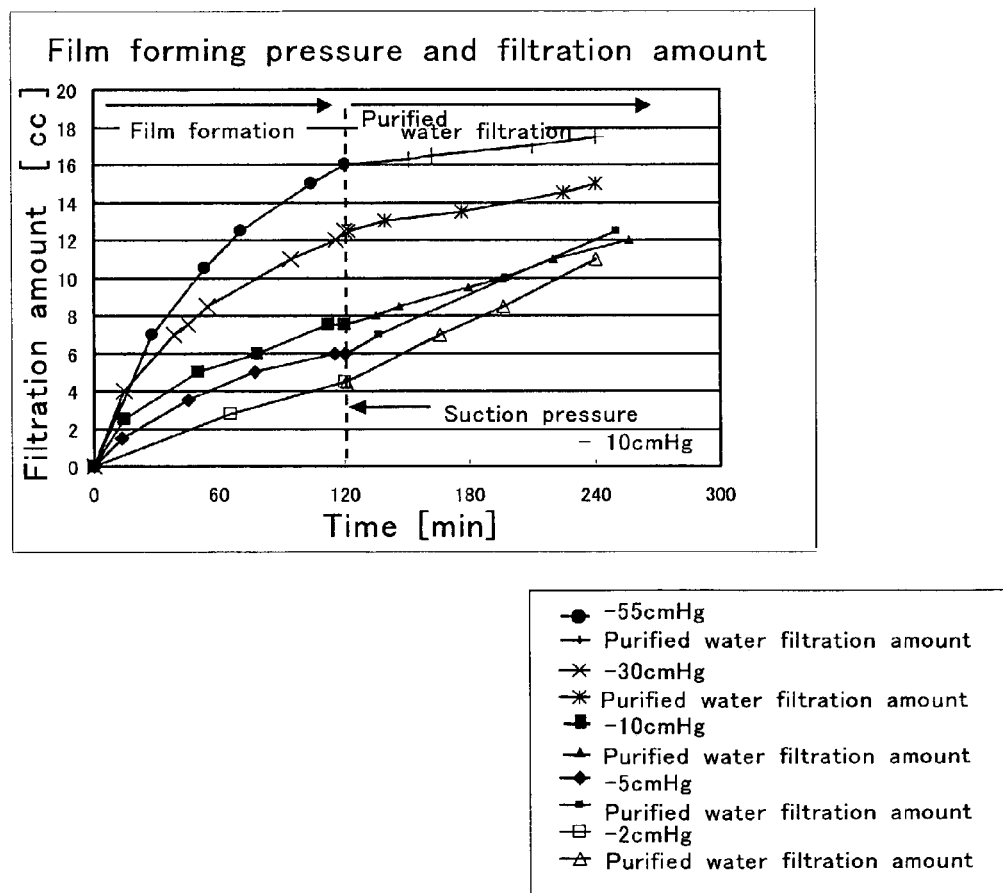
FIG. 3B shows the filtering capacity during the sequence of FIG. 3A.

The condition of forming second filter 2 will be described below referring to FIGS. 3A and 3B. FIGS. 3A and 3B show the conditions of forming second filter 2 and the amount of filtration afterwards.

In the formation process of second filter 2, a gel membrane cannot be easily formed by simply vacuuming the liquid when CMP slurry of a strong alkalinity such as the aforementioned ILD 1300 oxide film polishing slurry is used because of its resistance against gelation. Consequently, the membrane forming action of second filter 2 is weak and the sol particles of the substances penetrate into the gel membrane of second filter 2 and tend to clog second filter 2, thus reducing the filtration capacity.

In this embodiment, a coagulant such as $Al_2(SO_4)_3$ (aluminum sulfate) is added to the colloidal liquid at a ratio of 100 mg/L to form large coagulant particles of the substance to be removed in order to promote coagulation prior to the formation of second filter 2. The silicon concentration of the filtration liquid is 80 ppm or so when the coagulant is added, indicating that the coagulant particles can be readily gelated to form second filter 2. On the other hand, if no coagulant is added, the silicon concentration increases to 150 ppm, indicating that the filtration is not sufficiently carried out and second filter 2 does not grow quickly to the specified thickness.

Next, the filtration condition of second filter 2 will be described. When pure water without any colloidal objects is filtered through the second filter 2, the pure water filtration rate varies substantially depending on the formation condition of second filter 2, and the filtration rate can be nearly zero due to characteristics of the gel membrane, i.e., second filter 2, unless the formation condition of second filter 2 is not properly chosen. This coincides with the fact that it has been considered that the colloid solution cannot be filtered.

The characteristics shown in FIG. 3B were obtained empirically by the method shown in FIG. 3A. First filter 1 is provided at the bottom of a cylindrical container 21. Raw liquid 50 cc of an ILD 1300 oxide film polishing slurry 22 and a coagulant are poured. The gel membranes are formed, which received various suction pressures in this experiment. The remaining slurry 22 is dumped. A hundred cc of pure water 23 is added for filtration at an extremely low suction pressure. Thus, it was possible to investigate the filtration characteristics of the gel member, which is used as second filter 2. The diameter of first filter 1 used in this embodiment is 47 mm, and the area is 1734 $mm^3$.

In FIG. 3B, the gel membrane formation process is conducted for 120 minutes changing the suction pressures −55 cmHg, −30 cmHg, −10 cmHg, −5 cmHg, and −2 cmHg, to understand the characteristics of the gel membrane formed in each case. As a result, it was learned that the filtered amount was 16 cc and largest when the suction pressure was −55 cmHg, and decreased to 12.5 cc, 7.5 cc, 6 cc and 4.5 cc in a decreasing order of suction pressure.

Next, the content is switched to pure water to conduct filtration experiments using these gel membranes. The suction press used this time was set to −10 cm Hg constant. The filtration rate was only 0.75 cc/mn when the gel membrane formed with a suction pressure of −55 cmHg was used. It was approximately 1 cc/mn when the gel membrane formed with the suction pressure of −30 cmHg was used. However, the filtration rate was 2.25 cc/mn using the gel membrane formed with the suction pressure of −10 cmHg, 3.25 cc/mn using the gel membrane formed with the suction pressure of −5 cmHg, and 3.1 cc/mn using the gel membrane formed with the suction pressure of −2 cmHg, indicating that gel membranes formed with very weak suction pressures provide stable filtration.

From this experiment, it was learned that the filtration rate in the filtration process becomes the highest if the suction pressure is set so as to obtain a flow rate of approximately 3 cc/mn in the forming of the second filter 2.

The reason for this result is believed to be that the gel membrane tends to have a low degree of swelling and it is dense and hard, containing only a small amount of water, when the suction pressure is high during the formation of the membrane, so that very few passages become available for the pure water to pass.

On the other hand, if the suction pressure is weak, the gel membrane tends to be formed having a high degree of swelling and a low density, becomes softer, holding a large of water in a highly swollen state, and provides multiple passages for the pure water to pass. This can be easily understood by an analogy to a powdered snow slowly accumulating on the ground. This embodiment uses the gel membrane having a high degree of swelling formed with weak suction pressure.

FIGS. 2A and 2B are schematic diagrams showing only one side of the filter in FIG. 1 intended to be used for describing how the gel membrane is formed.

First filter 1 is immersed in the wastewater of a colloidal solution in a perpendicular position. When a coagulant or pH adjuster is added to the wastewater, several particles of substances 13 are combined together around the coagulant or pH adjuster which serves as the nucleus to form coagulated particles. These coagulated particles are shown as black dots in the drawing. When the wastewater is suctioned through first filter 1 with a weak suction pressure using pump 6, the coagulated particles are further combined together to become gelated on the surface of first filter 1, thus adhered to the surface of first filter 1. Gelated coagulation particles 14 shown with white dots in the drawing, in particular, those that are larger than filter pores 11 of first filter 1 are attracted to and accumulated on the surface of first filter 1 to form second filter 2 consisting of a gel membrane. Although coagulated particles 14 smaller than the diameters of filter pores 11 may pass through first filter 1, they do not cause any problem as the filtered water is returned to the wastewater in the process of forming second filter 2. As mentioned before, second filter 2 is formed taking as much time as approximately 120 minutes. Since suction is carried out with a weak suction pressure in this membrane forming process, gelated coagulation particles 14 are overlaid forming gaps of various shapes, eventually forming second filter 2 of a soft gel membrane with an extremely high degree of swelling. The water contained in the wastewater is suctioned through this gel membrane of the high degree of swelling and is taken out as the filtered water also through first filter 1, thus completing the filtration of the wastewater.

Second filter 2 is formed as a gel membrane with a high degree of swelling. By repeating the process of first dehydrating a gel membrane in close contact with first filter 1 by suctioning out water content through first filter 1 with a weak suction pressure, and then allowing a gel membrane adjacent to the membrane to replenish the lost water content by permeation, the filtration is conducted by allowing only the water content to permeate through second filter 2.

Further, air bubbles 12 are supplied to first filter 1 from the bottom of the wastewater tank to form a parallel flow in the wastewater along the surface of first filter 1. This is intended to make second filter 2 to be formed evenly over the entire surface of first filter 1 and to form gaps in second filter 2 so that it can be formed softly. Although it is typically set to supply 1.8 liters/minute of air flow, the amount of flow is selected depending on the desired nature of the membrane of second filter 2.

In the filtration process, gelated coagulation particles 14 indicated by white dots in the drawing are attracted to and accumulated slowly on the surface of second filter 2 by a weak suction pressure. In this case, the pure water permeates through second filter 2 and gelated coagulation particles 14, which are further accumulated and are indicated by white dots in the drawing, are taken out as the filtered water passes through first filter 1. In other words, in the case of CMP slurry, abrasive grinding stones such as silica, alumina or ceria, semiconductor debris generated by abrasive actions of the abrasive grinding stones, and process debris such as metal debris and/or insulation material debris are slowly accumulated and captured on the surface of second filter 2, while water is taken out as the filtered water after permeating through the gel membrane and first filter 1.

However, a thick gel membrane will be accumulated on the surface of second filter 2 after many hours of filtration as shown in FIG. 3B, causing the aforementioned gaps to be eventually clogged, and prevent the filtered water from being taken out. Therefore, it becomes necessary to remove the accumulated gel membrane to regenerate the filtration capability.

Figure 4:
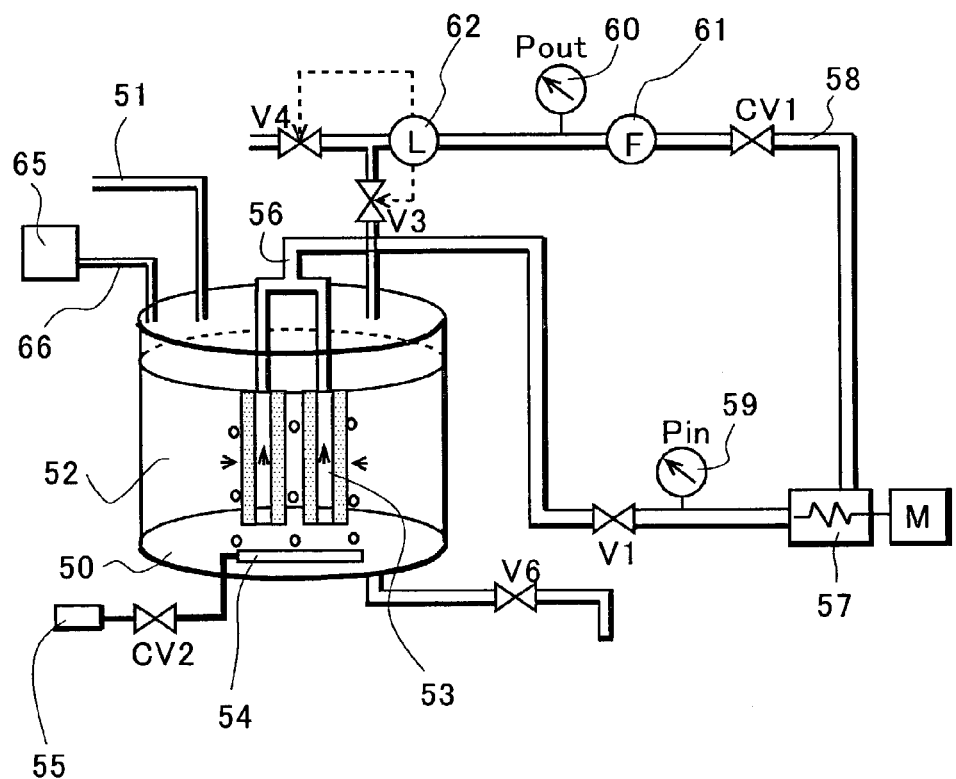
FIG. 4 is a schematic diagram of a filtering device of the first embodiment.

Next, the structure of the filtration device will be described below referring to FIG. 4. In FIG. 4, the numeral 50 denotes a raw water tank 50. A pipe 51 is provided above this tank 50 as a wastewater supply source. This pipe 51 introduces the liquid mixed with substances into tank 50. For example, in the case of the semiconductor industry, this is where wastewater (raw water) including the colloidal substances discharged from the dicing device, back grinding device, mirror polishing device or CMP device is to be introduced. This wastewater is the wastewater from the CMP device containing abrasive grinding stones and debris generated by abrasive grinding stones in the grinding or polishing process in this embodiment.

The numeral 65 denotes a chemical container, and the numeral 66 denotes a pipe that introduces chemicals from chemical container 65 to raw water tank 50. The chemicals are the aforementioned additives, i.e., coagulants or pH adjusters.

Raw water tank 50 containing water 52 holds a plurality of filtration devices 53 in which second filters are formed. Underneath these filtration devices 53, an air diffusion pipe 54, a pipe with multiple small holes similar to a bubbling device used in a fish tank, is provided in such a way as to allow the air bubbles to pass across the surface of filtration devices 53. Air diffusion pipe 54 covers the entire bottom area of filtration devices 53 so that air bubbles can be supplied evenly over the entire surface of filtration device 53. The numeral 55 denotes an air pump. In this case, each filtration device 53 includes first filter 1, frame 4, chamber 5 and second filter 2 as shown in FIG. 1.

A pipe 56 affixed to filtration device 53 corresponds to pipe 8 in FIG. 1. A pipe 56 guides the liquid filtered by filtration devices 53 and is connected to a magnetic pump 57 that provides suctioning action through a valve V1. A pipe 58 runs from magnetic pump 57 via control valve CV1 to a valve V3 and a valve V4. A first pressure gauge 59 is provided behind valve V1 on pipe 56 to measure a suction pressure Pin. A flow meter 61 and a second pressure gauge 60 are provided behind control valve CV1 on pipe 58 in order to control the flow so that flow meter 61 shows a constant flow. The air flow from air pump 55 is controlled by a control valve CV2.

Raw water 52 supplied through pipe 51 is stored in water tank 50, and is filtered by filtration devices 53. Air bubbles pass across the surface of second filters 2 provided on the filtration devices and generate parallel flows with a rising force and bursting of the bubbles in order to move gelated substances adhered to second filter 2 and prevent the filtration capability from dropping by making them to adhere evenly over the entire surface of filtration devices 53.

The aforementioned filtration devices 53, in particular, filtration devices 53 immersed in raw water tank 50 will be described below referring to FIGS. 5A–5C and FIGS. 6A–6D.

Figure 5A:
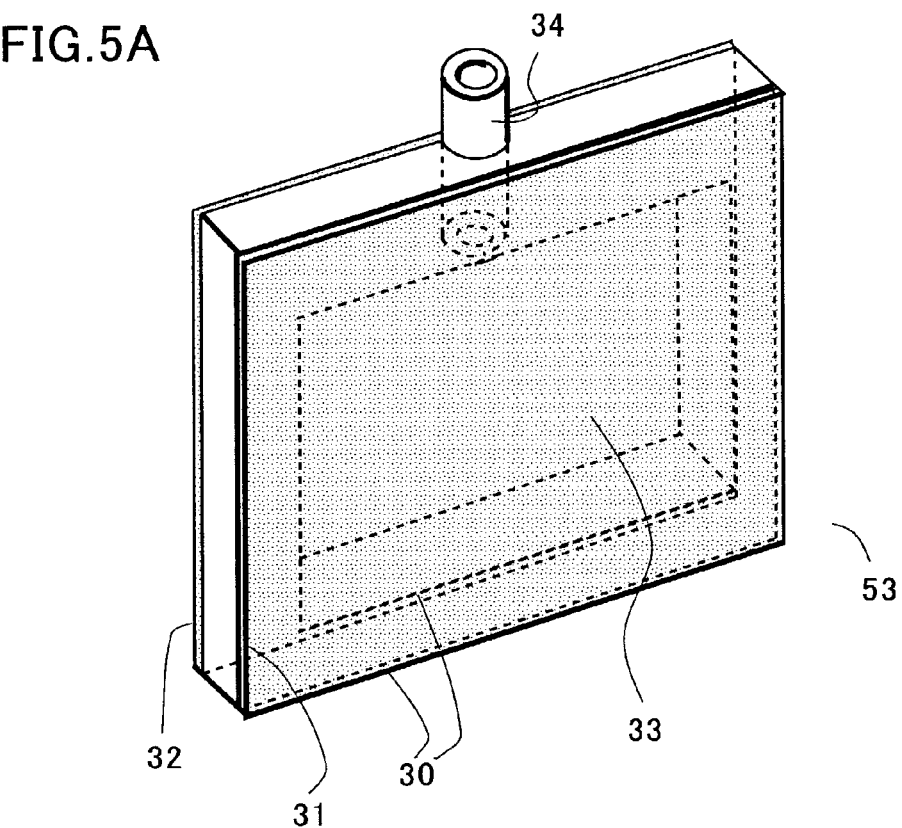
FIGS. 5A, 5B and 5C show variations of filter placement of the first embodiment.

The numeral 30 shown in FIG. 5A is a frame, which looks like a picture frame and corresponds to frame 4 shown in FIG. 1. Filter membranes 31 and 32, which serve as first filter 1 (FIG. 1), are glued on and affixed to both sides of this frame 30. The liquid in a space 33 (corresponds to chamber 5 in FIG. 1) surrounded by frame 30 and filter membranes 31 and 32 is suctioned through a pipe 34 (corresponds to pipe 8 in FIG. 1) to be filtered by filter membranes 31 and 32. The filtered water is taken out through pipe 34 which is attached to frame 30 with a seal. The junctions between frame 30 and filter membranes 31 and 32 are completely sealed so that no wastewater enters into space 33 except through the filter membranes.

Since the filter membranes 31 and 32 in FIG. 5A are thin resin membranes, they may inwardly warped and may end up breaking when suction is applied. Therefore, in order to minimize this warping and still have a large filtration capacity, it is necessary to increase space 33. FIG. 5B shows this configuration. Although only nine spaces 33 are shown in FIG. 5B, there are more in the actual device. The filter membrane 31 of this embodiment is a polyolefin polymer membrane with a thickness of approximately 0.1 mm and the thin filter membrane is formed in a pouch-like shape, which is shown as FT in FIG. 5B. Frame 30 fitted with pipe 34 is inserted into this pouch-like thin filter FT, while filter FT is attached to frame 30. The symbol RG denotes a hold down elements, which serves to hold down the frame attached with filter FT from both sides. Filter FT is exposed through an opening OP of the hold down elements. Details will be described later referring to FIG. 6.

Figure 5C:
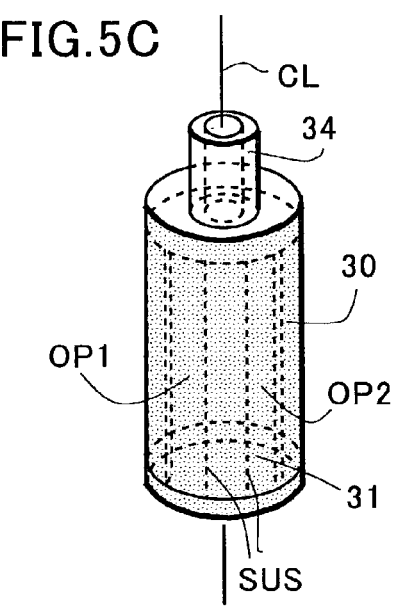
Figure 5B:
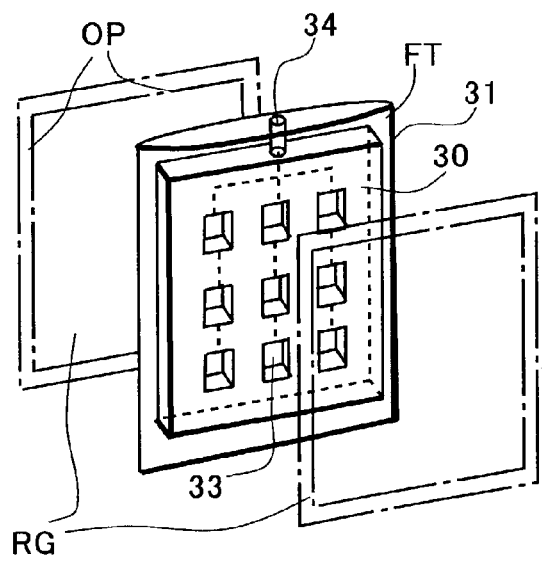

FIG. 5C shows a case where filtration device 53 is made into a cylindrical shape. The frame attached to pipe 34 is also cylindrical, and openings OP1 and OP2 are provided on the side. Since the sides that correspond to openings OP1 and OP2 are removed, a supporting element SUS is provided between the openings to support filter membrane 31. Filter membrane 31 is attached on the side.

Filtration device 53 shown in FIG. 5B will now be described referring to FIGS. 6A–6D.

First, a portion 30a that corresponds to frame 30 of FIG. 5B will be described referring to FIG. 6A and FIG. 6B. Portion 30a is shaped like a cardboard. It includes two thin resin sheets SHT1 and SHT2, between which a plurality of sections SC are provided in a vertical direction, thus providing spaces 33 surrounded by resin sheets SHT1 and SHT2 and sections SC. The cross section of each of these spaces 33 is 3 mm by 4 mm, so that they provide as a group a shape as if it is an array of straws of rectangular cross section. Since portion 30a functions to keep apart the filter membranes FT on both sides, it is hereinafter called a spacer.

On the surfaces of thin resin sheets SHT1 and SHT2 that constitute this spacer 30a provided are numerous holes HL with a diameter of 1 mm, and filter membranes FT are glued on the surfaces. Therefore, the filtered water filtered by filter membranes FT passes through holes HL and space 33, and finally out to pipe 34.

Filter membranes FT are glued on both sides SHT1 and SHT2 of spacer 30a. Since there are areas where holes HL are not formed on both sides SHT1 and SHT2 of spacer 30a, gluing filter membrane FT1 directly onto those surfaces creates areas on filter membranes FT1, which are incapable of filtering, incapable of allowing the wastewater to pass through, and incapable of capturing substances, corresponding to areas where no HL holes exist. In order to avoid this phenomenon, at least two sheets of filter membranes FT are glued together. The outermost filter membrane FT1 is the filter membrane to capture the substances, and inner filter membranes with larger holes than filter membrane FT1 are provided at the side of SHT1. In this embodiment, one other filter membrane FT2 is glued on. Therefore, even where no hole HL is formned on spacer 30a, the entire surface of filter membrane FT1 becomes capable of filtering, thus allowing the entire surface of filter membrane FT1 to capture substances, and forming the second filter membranes over the entire surfaces of the front and back side surfaces SH1 and SH2, due to filter membrane FT2 located in between. Although filter membranes SHT1 and SHT2 are expressed as rectangular sheets in the drawing, they are formed like pouches as shown in FIG. 5B.

Next, it will be described below how pouch-like filter membranes SHT1 and STH2, spacer 30a, and hold down elements RG are assembled together referring to FIG. 6A, FIG. 6C and FIG. 6D.

Figure 6A:
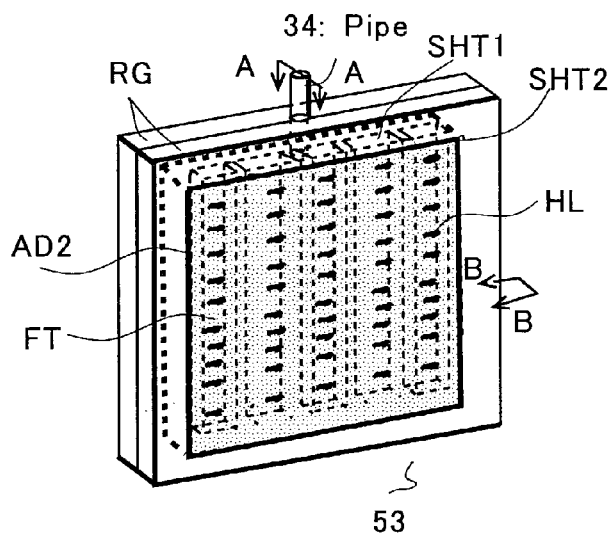
FIGS. 6A, 6B, 6C and 6D show detailed configurations of the filters and the related support structures.
Figure 6D:
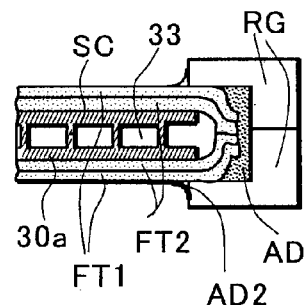
Figures 6B, 6C:
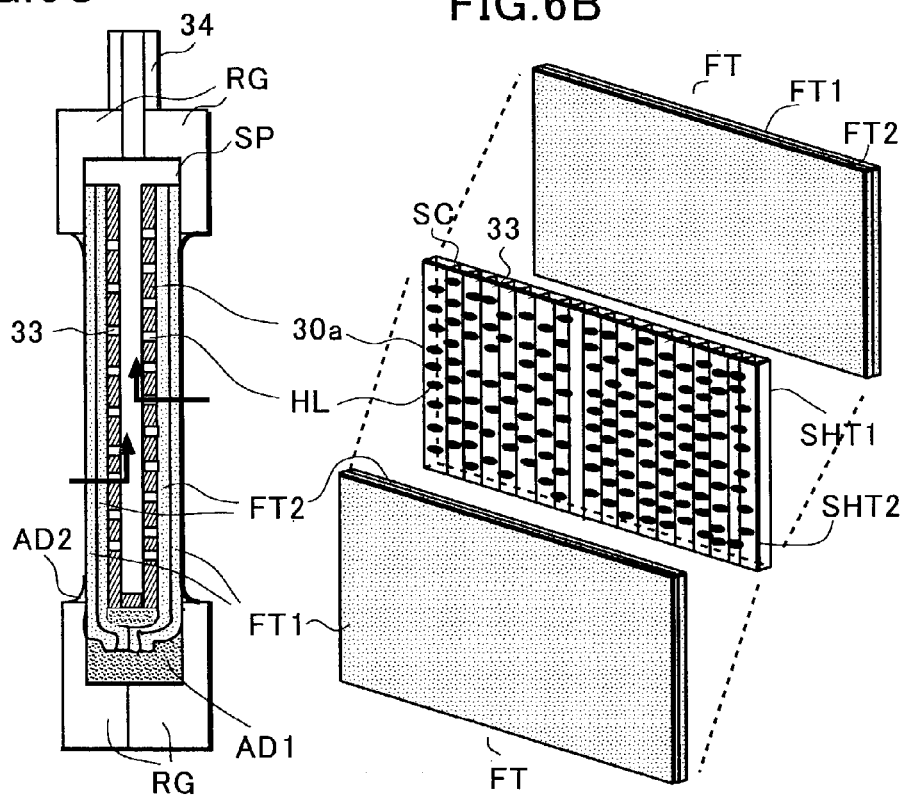

FIG. 6A is a perspective view of the completed assembly, FIG. 6C is a cross-sectional view along the line A—A in FIG. 6A through the head of pipe 34 in the extending (vertical) direction, FIG. 6D is a cross-sectional view of filter device 35 along line B-B in the horizontal direction.

As shown in FIG. 6A, FIG. 6C and FIG. 6D, spacer 30a inserted in pouch-like filter membrane FT is coverd on four sides including filter membrane FT by hold down elements RG. The three sides are sealed like a pouch, and these three sides and the remaining side are affixed to the hold down elements RG by adhesive AD1 coated on hold down elements RG. A space SP is formed between the remaining one side (opening of the pouch) and hold down elements RG, and the filtered water generated in space 33 is suctioned to pipe 34 through space SP. Adhesive AD2 is provided all along the circumference of opening OP of hold down elements RG to seal the circumference, preventing the liquid from entering except through the filter.

Space 33 and pipe 34 thus communicate with each other so that suctioning through pipe 34 causes the liquid to pass through the holes, of filter membrane FT and holes HL of spacer 30a into space 33, allowing the filtered water to be transferred from space 33 via pipe 34 to the outside.

Filtration device 53 used here is constructed as shown in FIGS. 6A–6C, and the size of the frame (hold down elements RG) to which the filter membrane is attached is the A4 size, i.e., approximately 19 cm in the vertical direction, approximately 28.8 cm in the horizontal direction and 5–10 mm in thickness. Since filtration device 53 is provided on both sides of the frame, the actual area (0.109 m$^2$) is twice the area shown above. The number of filtration devices and size are arbitrarily depending on the size of raw tank 50 and the desired amount of filtration.

The actual filtration method using the filtration device shown in FIG. 4 will be described more specifically in the following.

First, wastewater containing substances in a colloidal solution state is supplied to raw tank 50 via pipe 51. Next, an additive, such as a coagulant or pH adjuster, is added through pipe 66. Filtration devices 53 with only first filters 1 where second filters 2 are not yet formed are immersed into tank 50, and circulate the wastewater while suctioning with a weak suction pressure by pump 57 via pipe 56. The circulation route is from filtration devices 53, pipe 56, valve V1, pump 57, pipe 58, control valve CV1, flow meter 61, optical sensor 62, to valve V3, and the wastewater is suctioned from tank 50 and returned to tank 50.

Circulation of the wastewater forms second filter 2 on first filters 1 (31 in FIGS. 5A–5C) of filtration devices 53 and eventually causes the substances in a colloidal solution state to be captured as intended.

When the wastewater is suctioned with a weak suction pressure via first filter 1 by pump 57, the coagulated particles become easily gelated and adhere to the surface of first filter 1. The gelated coagulation particles larger than filter pores 11 of first filter 1 are adhered to and accumulated on the surface of first filter 1 to form filter 2 that is a gel membrane. Although the coagulated particles pass through first filter 1 the water contained in the wastewater is suctioned through the gel membrane and taken out as the purified water in the process of forming second filter 2, thus allowing the wastewater to be filtered.

Optical sensor 62 monitors the concentration of the coagulated particles contained in the filtered water, and starts the filtration after confirming that the concentration of the coagulated particles is lower than a predetermined amount. As the filtration starts, valve V3 is closed and V4 is opened by the detection signal from optical sensor 62 to close the aforementioned circulation flow. Therefore, the purified water is taken out from valve V4. Air diffusion pipe 54 supplies air bubbles to the surfaces of filtration devices 53 being controlled by control valve CV2, as the air bubbles are supplied by air pump 55.

As the filtration continues, the concentration of the substances in the wastewater increases as the water contained in the wastewater in raw water tank 50 is taken out as the purified water. In other words, the colloidal solution's viscosity increases. Therefore, the additional wastewater is supplied to raw water tank 50 via pipe 51 to hold down the concentration rise in the wastewater in order to increase the filtration efficiency. However, the gel membrane on the surface of second filter 2 of filtration device 53 increases its thickness, and second filter 2 eventually becomes clogged to make it impossible to filtrate any further.

As second filter 2 of filtration device 53 clogs, regeneration of second filter 2 is attempted. In other words, the negative suction pressure applied on filtration device 53 is cancelled by stopping pump 57.

Figure 7A:
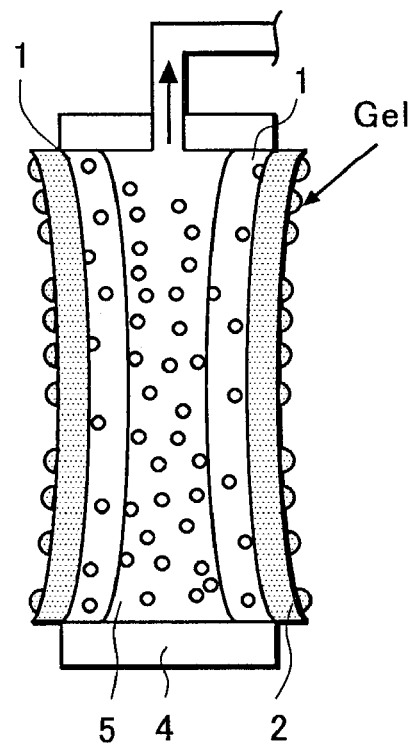
FIGS. 7A and 7B compare the configurations of the filters during the filtering process and the degeneration process.
Figure 7B:
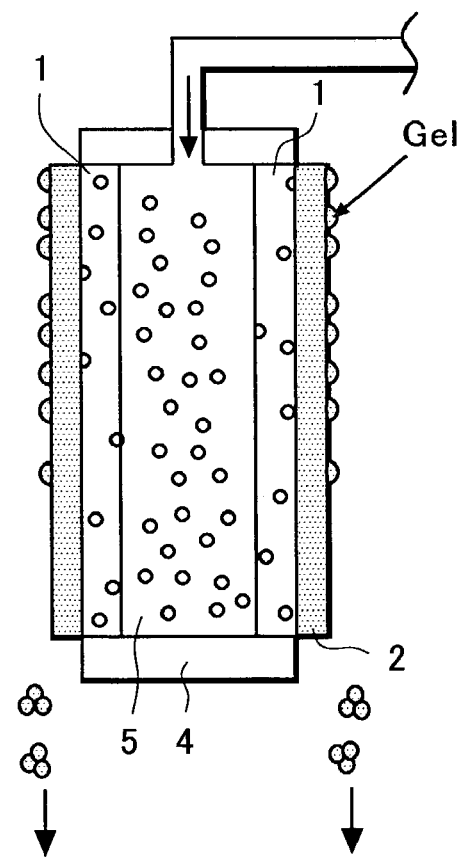

The regeneration process will be described in further detail referring to FIGS. 7A–7B. FIG. 7A shows the condition of filtration device 53 during the filtration process. Since the pressure inside chamber 5 of first filter 1 is negative relative to the outside pressure due to the weak suction pressure applied, first filter 1 is warped toward the inside. Therefore, second filter 2 adhered to its surface is also warped toward the inside. Furthermore, the gel membrane slowly built up on the surface of second filter 2 is formed the same way.

However, the weak suction pressure is cancelled in the regeneration process and the inside pressure returns almost to the atmospheric pressure, so that first filter 1 of filtration device 53 returns to its original form. This make both second filter 2 and the gel membrane on its surface also return to their original form. As the suction pressure that attracted the gel membrane disappears, the gel membrane loses the force that attracted it to filtration device 53 and receives a force to swell outward at the same time. This causes the gel membrane starts to drop off from filtration device 53. In order to encourage this drop off, the rate of the air bubbles from air diffusion pipe 54 can be approximately doubled. According to an experiment, the drop off starts at the bottom edge of filtration device 53. The gel membrane of second filter 2 on the surface of first filter 1 drops off like an avalanche and falls to the bottom of raw water tank 50. Later, second filter 2 can be formed again by circulating the wastewater through the aforementioned circulation passage. This regeneration process restores second filter 2 to its former state that makes it possible to filter the wastewater again.

In the regeneration process, the aforementioned coagulant or pH adjuster should be added to facilitate gelation of the substances before forming second filter 2.

Moreover, by reversing the flow of the filtered water into chamber 5 during the regeneration process, it first assists first filter 1 to return to its the original form and also applies the static water pressure of the filtered water to cause the filter to bulge outside. Secondly, the filtered water seeps from the inside of first filter 1 through filter pores 11 to the boundary between first filter 1 and second filter 2, thus promoting the drop off of the gel membrane of second filter 2 from the surface of first filter 1.

As can be seen from the above, if the filtration is continued while regenerating second filter 2, the concentration of the substances of the wastewater in raw water tank 50 increases and the viscosity of the wastewater increases substantially as well. Therefore, when the concentration of the substances of the wastewater reaches a specified concentration, the filtration process should be stopped and the substances should be allowed to sediment. When the concentrated slurry has accumulated at the bottom of tank 50, valve 6 should be opened to collect this gel-state concentration slurry. The collected concentration slurry is then compressed or dried by heating to remove water content to further reduce the volume. This can substantially reduce the amount of slurry to be handled as industrial waste.

The operating condition of the filtration device shown in FIG. 4 will now be described referring to FIG. 8. The operation was conducted using both sides (area: 0.109 $m^2$) of a single A4 size filtration device 53 described above. The initial flow rate is set to 3 cc/hour (0.08 $m^3$/day) which provides a high filtration efficiency as mentioned above, and the flow rate after regeneration is also set to the same. The air blow rate is 1.8 L/min for membrane forming and filtration, and 3 L/min for regeneration. Pin and Re-Pin are suction pressures and measured by pressure gauge 59. Pout and Re-Pout are pressures of pipe 58 and measured by pressure gauge 60. The flow rate and re-flow rate are measured by flow meter 61 and represent the filtered rate suctioned through filtration device 53.

Figure 8:
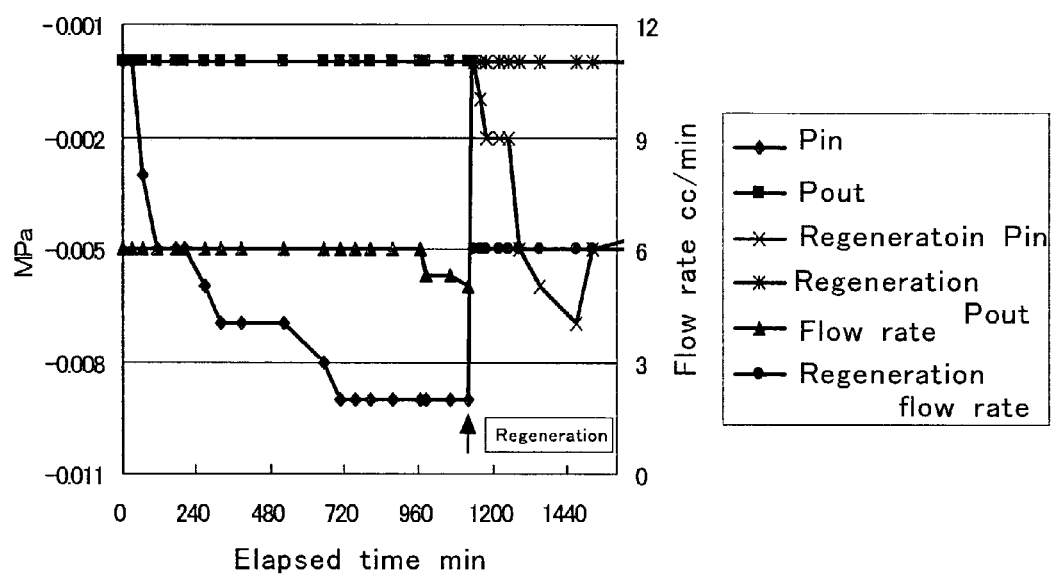
FIG. 8 shows the filtration rate and the pressure applied to the filters during the formation of the second filter and the filtration.

In FIG. 8, the Y axis scale on the left side represents pressure (unit: MPa) and the negative pressure increases as it moves closer to X-axis. The Y axis scale on the right side represents the flow rate (unit: cc/min). The X axis scale represents the time elapsed since the membrane formation (unit: min).

The flow rate and re-flow rate are both controlled to maintain 3 cc/min in the membrane forming process, filtration process and filtration process after regeneration for second filter 2. As a consequence, second filter 2 is a gel membrane formed by a softly attracting gel using an extremely weak suction pressure Pin such as −0.001 MPa to −0.005 MPa.

In the filtration process, Pin is gradually increased from −0.005 MPa to maintain a constant flow rate. The filtration process is continued for 1000 minutes, and the regeneration process is started when the flow rate starts to drop. The drop in the flow rate occurs as the gel membrane on the surface of second filter 2 becomes too thick and clogged.

After regenerating second filter 2, coagulants or pH adjusters are added, and gradually increase re-Pin to continue the filtration process maintaining a constant re-flow rate. Regeneration and re-filtration of second filter 2 are continued until the concentration of raw water 52 reaches five to ten times.

It is also possible to keep the suction pressure constant at −0.005 MPa to gain a large filtration rate. In this case, the filtration flow rate gradually reduces as second filter 2 starts to clog, but it provides benefits such as a longer filtration time and easier control of pump 57. Regeneration of second filter 2 can simply be performed when the filtration flow rate drops below a certain value in this case.

The accumulated volumes of filtration with and without the use of a coagulant will be compared below referring to FIG. 9. The experiment was conducted by using both sides of a single A4 size filter (area: 0.109 m$^2$) of filtration device 53 mentioned above. In the diagram, curves with square marks indicate a filtration using ILD 1300 slurry diluted to 20 wgt % with purified water and added with 100 mg/L of $Al_2(SO_4)_3$ (aluminum sulfate) as the coagulant at each gel membrane forming process, while curves with triangular marks indicate a case without using any coagulant. The suction pressure was maintained at 97 kPa. The gel membrane forming and filtration process was 120 minutes in each cycle with a 10 minute regeneration process between the cycles.

Figure 9:
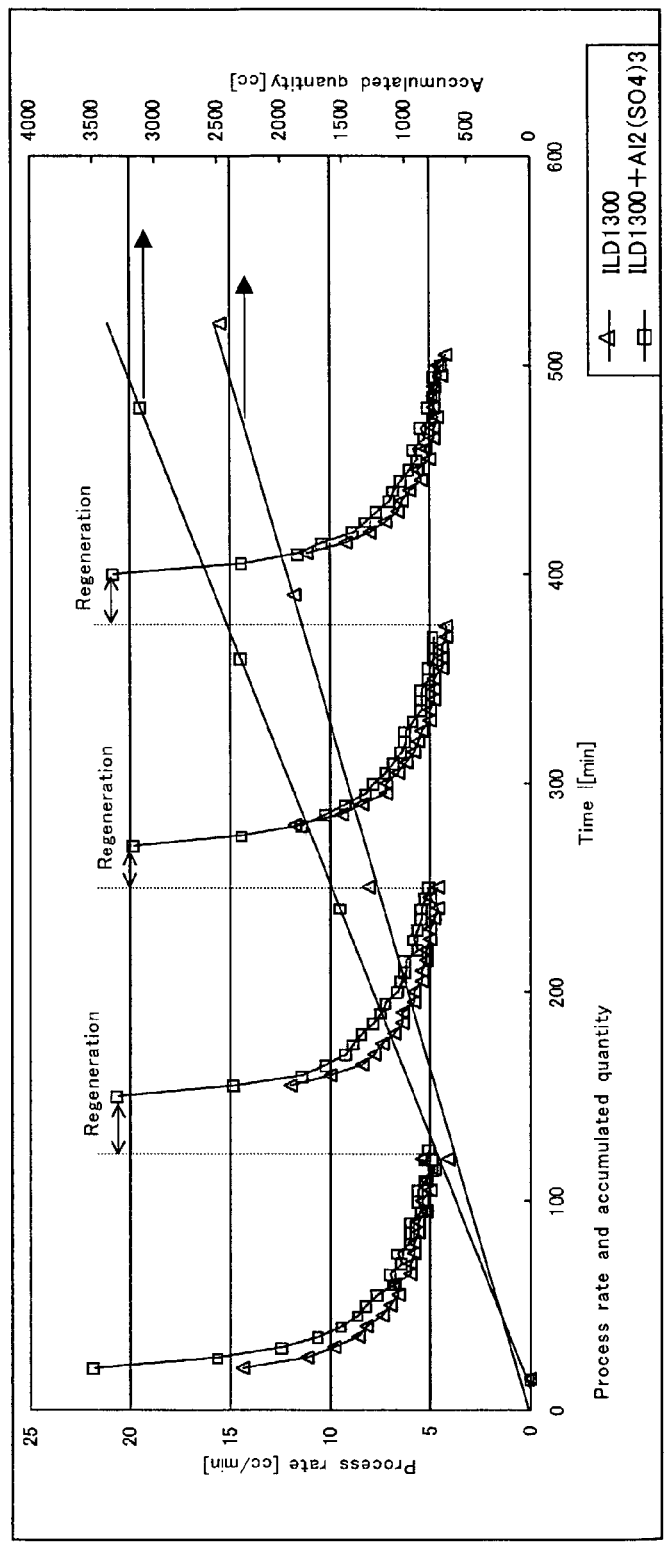
FIG. 9 shows a sequence of repeated second filter generation and filtration.

As can be seen from FIG. 9, the gel membrane formation process was faster and second filter 2 of a better quality membrane was formed, consequently providing a higher filtration amount, in each cycle when the coagulant was used. On the contrary, when no coagulant was used, gel membrane formation was insufficient, the formation of second filter 2 was delayed, and it required a longer time to enter the filtration process, consequently providing a lower filtration amount.

The accumulated filtration amount was approximately 3500 cc when the coagulant was used, while the same was substantially less, approximately 2500 cc, when no coagulant was used. Moreover, clogging occurred sooner and the filtration rate saturated at 5 cc/min in each cycle when no coagulant was used. This indicates that filtration is far easier in forming gel membranes from coagulated particles.

Moreover, the silicon concentration was approximately 80 ppm when the coagulant was added indicating that coagulant particles quickly become gelated to form second filter 2. On the other hand, the silicon concentration increased to 150 ppm when no coagulant was used, indicating that the filtration was not performed sufficiently because second filter 2 did not grow quickly to the desired gel membrane thickness.

Figure 10:
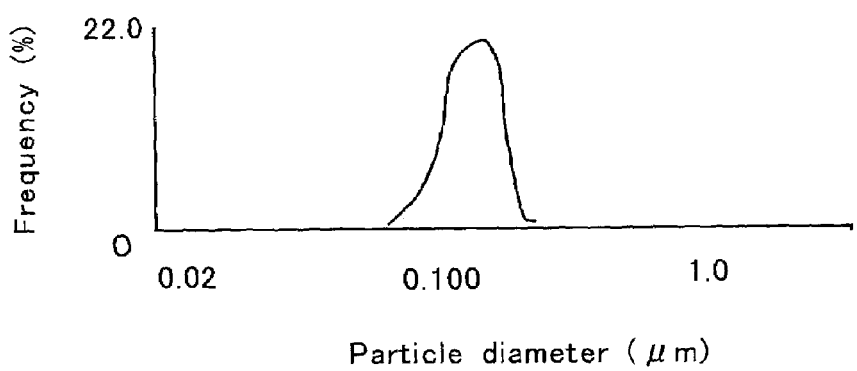
FIG. 10 shows a size distribution of colloidal particles in a CMP slurry.

FIG. 10 shows the particle diameter distribution of the abrasive grinding stones contained in the CMP slurry. The abrasive grinding stones are to process the interlayer insulation film made of Si oxides, normally called silica. The minimum particle diameter was approximately 0.076 $\mu$m and the maximum particle diameter was 0.34 $\mu$m. The large particles were coagulated particles formed by joining multiple particles. The mean particle diameter was approximately 0.1448 $\mu$m and had a distribution peak in the neighborhood of 0.13–0.15 $\mu$m. The slurry adjusters typically used are KOH and $NH_3$. The pH value was between 10 and 11.

The abrasive grinding stones used for CMP are mainly silica-based, alumina-based, cerium-oxide-based and diamond-based, while others made of chromium-oxide-based, iron-oxide-based, manganese-oxide-based, $BaCO_4$-based, antimony-oxide-based, zirconia-based and yttrium-based are also used. Silica-based slurries are used for planarizing interlayer insulation films of semiconductors, P—Si, SOI, Al/glass disks and the like. Alumina-based slurries are used for polishing computer hard disks as well as planarization of all kinds of metals and Si oxide films. Cerium oxides slurries are used for polishing glass and Si oxides, while chromium oxides are used for grinding steels. Slurries with manganese oxide and $BaCO_4$ are used for polishing tungsten wiring.

Some of the abrasives used for CMP are oxide sols and these are essentially colloid-size fineparticles of metal oxides or hydroxides such as silica, alumina, and zirconia uniformly dispersed in water or another liquid, and are used for planarization of interlayer insulation films of semiconductor devices or metal parts as well as for preparation of information disks such as aluminum disks.

Another embodiment of the present invention will now be described referring to FIG. 11. Elements that are identical to those used in FIG. 4 are identified by using the same numerals.

Figure 11:
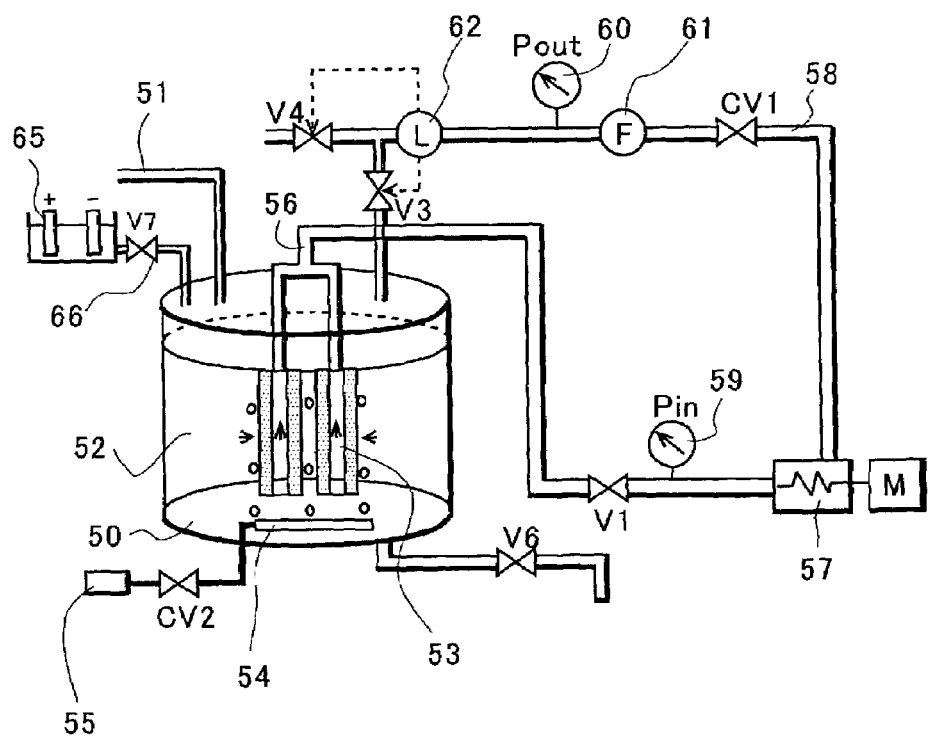
FIG. 11 shows a filtering device of a filtering method of a second embodiment of this invention.
Figure 12:
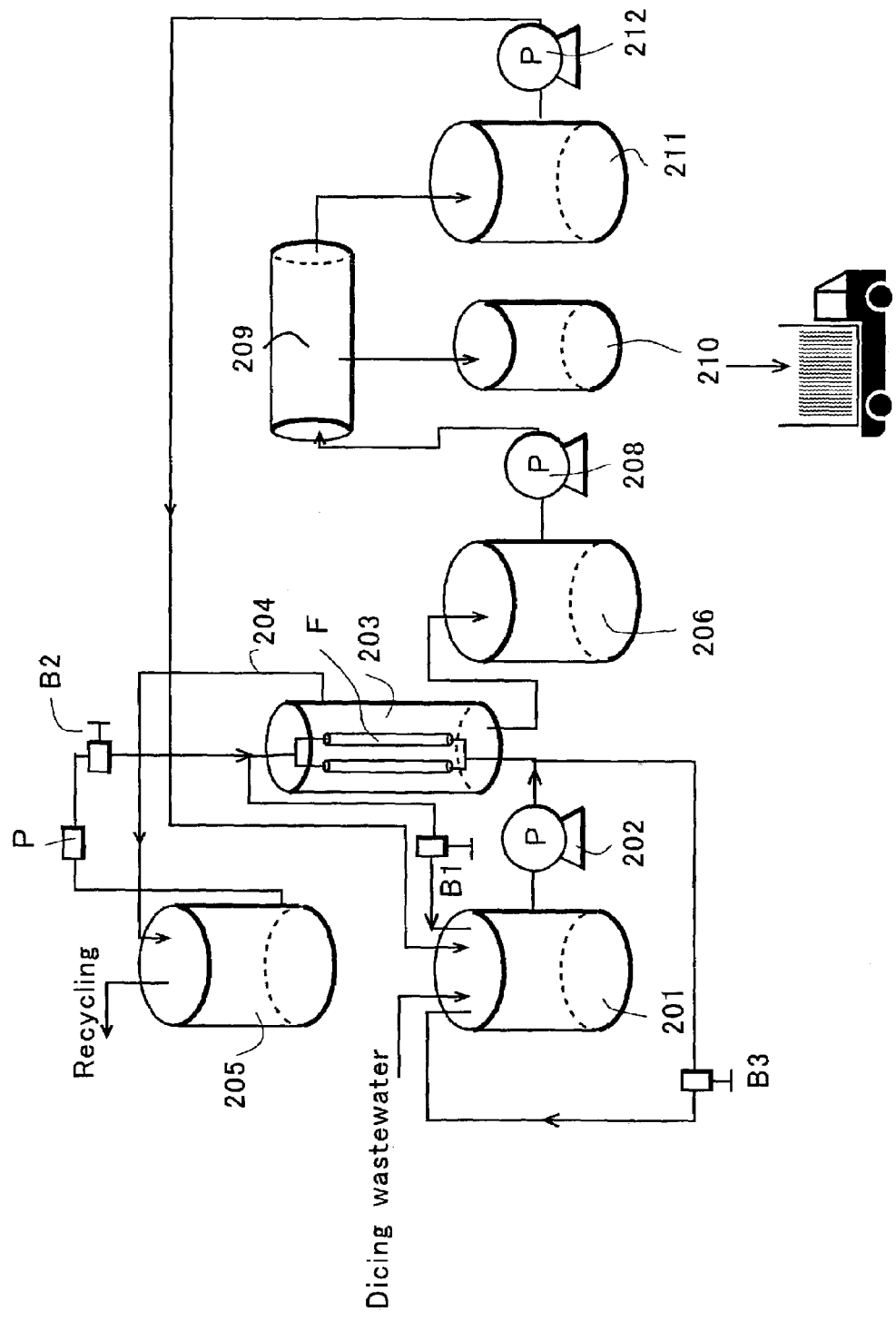
FIG. 12 shows a conventional filtering system.
Figure 13:
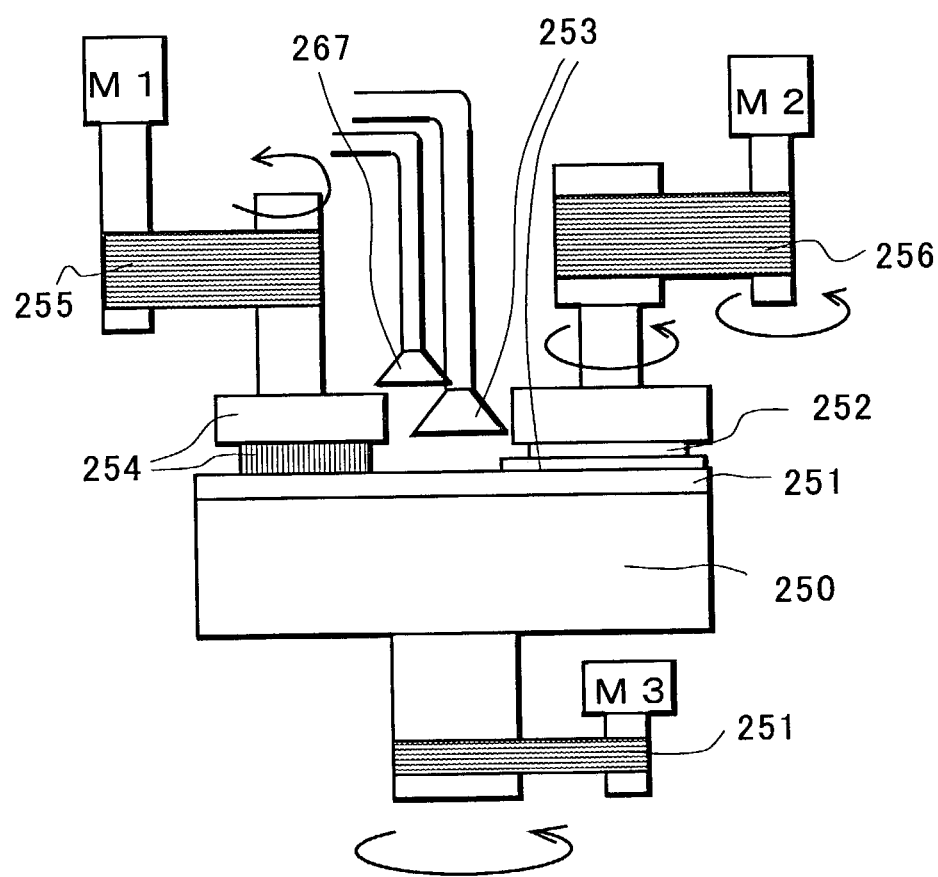
FIG. 13 shows a CMP apparatus.
Figure 14:
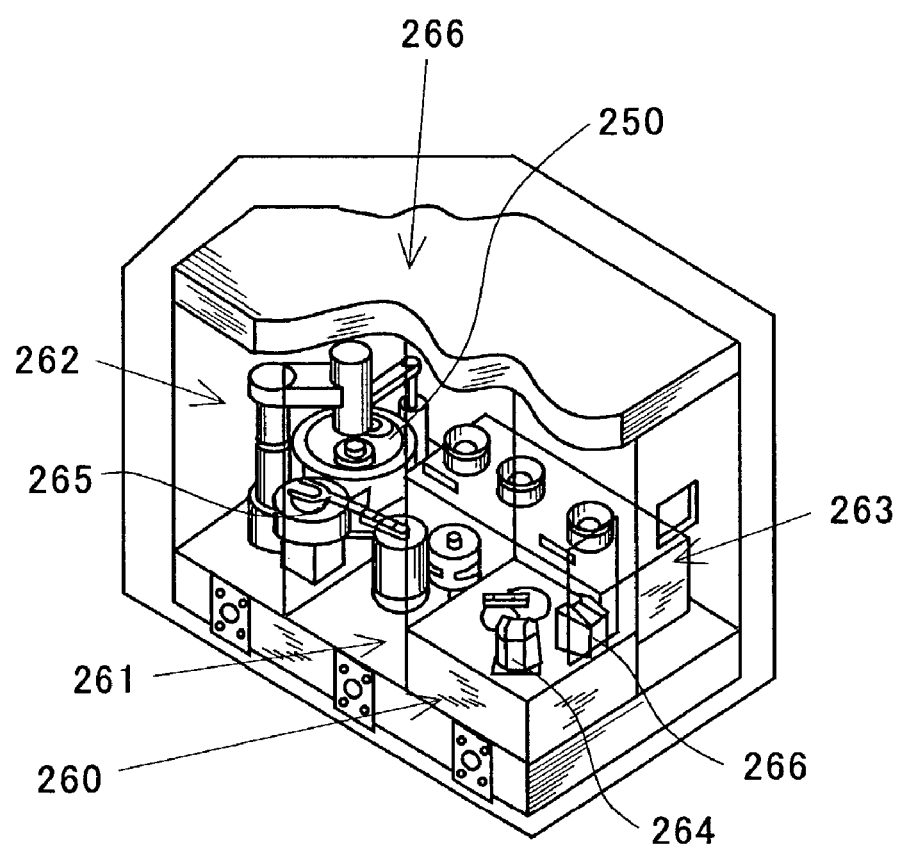
FIG. 14 shows a CMP apparatus used in a CMP system.

In FIG. 11, the numeral 50 denotes a raw water tank. A pipe 51 is laid above tank 50 to supply the wastewater. Pipe 51 introduces a liquid containing substances into tank 50. More specifically, wastewater (raw water) mixed with an ammonia-based CMP, e.g., ILD 1300, is introduced.

The numeral 65 denotes a chemical generating container, and the numeral 66 denotes a pipe that introduces chemicals from chemical generating container 65 to raw water tank 50. Chemical generating container 65 holds a water solution of sodium chloride and generates hypochlorous acid or sodium hypochlorite by electrolysis. Therefore, by opening a valve V7, pipe 66 supplies electrolytic water containing hypochlorous acid or sodium hypochlorite. It is acceptable to directly use hypochlorous acid without using electrolysis.

Raw water tank 50 containing water 52 holds a plurality of filtration devices 53 in which second filters are formed. Underneath these filtration devices 53, an air diffusion pipe 54, a pipe with multiple small holes similar to a bubbling device used in a fish tank, is provided in such a way as to allow the air bubbles to pass across the surface of filtration devices 53. Air diffusion pipe 54 covers the entire bottom area of filtration devices 53 so that air bubbles can be supplied evenly over the entire surface of filtration device 53. The numeral 55 denotes an air pump. In this case, each filtration device 53 comprises first filter 1, frame 4, chamber 5 and second filter 2 as shown in FIG. 1.

A pipe 56 affixed to filtration device 53 corresponds to pipe 8 in FIG. 1. A pipe 56 guides the liquid filtered by filtration device 53 and is connected to a magnetic pump 57 that provides suctioning action through a valve V1. A pipe 58 runs from magnetic pump 57 via control valve CV1 to a valve V3 and a valve V4. A first pressure gauge 59 is provided behind valve V1 on pipe 56 to measure a suction pressure Pin. A flow meter F and a second pressure gauge 60 are provided behind control valve CV1 on pipe 58 in order to control the flow so that flow meter 61 shows a constant flow. The air flow rate from air pump 55 is controlled by a control valve CV2.

Raw water 52 supplied through pipe 51 is stored in water tank 50, and is filtered by filtration devices 53. Air bubbles pass across the surface of the second filters provided on the filtration devices and generate parallel flows with the rising force and bursting of the bubbles in order to move gelated substances adhered to second filter 2 and minimize the filtration capability drop by causing them to adhere evenly over the entire surface of filtration devices 53.

When an ammonia-based CMP slurry is used, the filtered water also emits an ammonia odor so that there is a necessity to take some measures to remove this. However, by introducing electrolytic water containing hypochlorous acid or sodium hypochlorite or adding hypochlorous acid into raw water tank 50 the following chemical reactions occur:

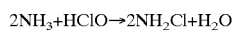

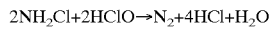

In other words, adding hypochlorous acid (HClO) or sodium hypochlorite (NaClO) to wastewater containing ammonia-based CMP slurry first produces chloramine ($NH_2Cl$) and water, and then chloramine reacts with hypochlorous acid to produce nitrogen gas ($N_2$), hydrochloric acid and water. Thus, ammonia in the wastewater turns into nitrogen gas and is discharged into the atmosphere harmlessly, and hydrochloric acid is adjusted to make the pH value of the ammonia-based CMP slurry neutral. The dechlorination reaction by hypochlorous acid removes the ammonia odor of the filtrated water, and at the same time the strongly alkaline wastewater becomes pH adjusted to promote gelation, so that ammonia-based CMP slurry, whose gelation was considered difficult to achieve, can be efficiently implemented.

This invention provides a method of filtering substances in colloidal solutions without using a filter membrane having pores smaller than 0.15 μm, but rather forming a filter of a gel membrane using coagulants or pH adjusters that help promote gelation. Further, an extended use of the second filter is achieved by minimizing the probability of clogging with the selected optimum formation condition of the second filter and a constant filtration rate. It is easy to regenerate the second filter because the gel accumulated on the surface of the second filter can be removed by its own weight by simply stopping the suctioning of the pump. This makes it possible to conduct the cycle of filtration, regeneration and refilteration repeatedly. Thus making this filtration process continues for an extremely long time. Further, the reverse washing required in conventional filtration method is not necessary because the gel accumulated on the surface of the second filter can be removed in the regeneration of the second filter by the force that brings back the filters that has been bulging outward by simply stopping the suction of the pump. The removal of the gel can be also promoted by applying the rising force and bursting force of the air bubbles to the surface of the second filter by increasing the rate of air bubbles during the regeneration.

Further, since a weak suction pressure is used ito prevent the second filter from clogging, a smaller pump can be used. Also, since the water that passes through the pump is the filtered water, there is no concern for wear by the substances, and the service life is substantially extended. Because the system is more compact, the cost of electricity and the pump replacement can be substantially minimized, i.e., the initial cost and the running cost can be reduced. Further, since the raw water tank is the only tank needed for concentration, extra piping, tanks and pumps are unnecessary, making it a resource saving type system. Further, when the wastewater mixed with an ammonia-based CMP slurry is used, the ammonia is decomposed by dechlorination reaction. Since this can promote the pH adjustment by hydrochloric acid generated as the result of the decomposition, gelation once considered to be difficult to achieve, can be efficiently implemented.

What is claimed is:

1. A method of filtering a colloidal solution containing colloidal substances, comprising:
   providing a first filter in the colloidal solution;
   adding an additive to the colloidal solution so that the colloidal substances are coagulated in the colloidal solution and that the coagulated colloidal substances are not large enough to generate flocks which sediment;
   sucking the colloidal solution through the first filter so that the coagulated colloidal substances are accumulated on a surface of the first filter to form a gel membrane as a second filter; and
   sucking the colloidal solution through the second filter formed on the first filter so that a thickness of the gel membrane increases as the coagulated colloidal substances are added to the gel membrane.

2. The filtering method of claim 1, wherein the additive comprises a coagulant or a pH adjuster.

3. The filtering method of claim 2, wherein the coagulant comprises a aluminum chloride or an aluminum sulfate.

4. The filtering method of claim 2, wherein the pH adjuster comprises hydrochloride or sodium hydroxide.

5. The filtering method of claim 1, wherein the sucking of the colloidal solution comprises applying a suction pressure to the first filter so that a filtration rate during the formation of the second filter is approximately equal to a filtration rate during the sucking using the second filter.

6. The filtering method of claim 1, wherein the sucking of the colloidal solution through the second filter comprises applying a low pressure to the second filter so as to maintain a filtration rate of the second filter within a proper range for an extended period.

7. The filtering method of claim 1, wherein the sucking of the colloidal solution through the second filter comprises applying a suction pressure to the first filter and increasing the suction pressure gradually during the sucking of the colloidal solution through the second filter so that a constant filtration rate is maintained.

8. The filtering method of claim 1, wherein the sucking of the colloidal solution to form the gel membrane is performed under a suction pressure and the sucking of the colloidal solution through the second filter is performed under the same suction pressure as the sucking of the colloidal solution to form the gel membrane.

9. The filtering method of claim 1, wherein the sucking of the colloidal solution through the second filter comprises applying a constant low pressure to the second filter so as to maintain a filtering for an extended period.

10. The filtering method of any one of claims 1, 2, 3, 4, 5, 6, 7 and 8, wherein the colloidal solution comprises a CMP slurry.

11. The filtering method of any one of claims 1, 2, 3, 4, 5, 6, 7 and 8, wherein a part of the colloidal substances is debris formed during a CMP process.

12. A method of filtering a colloidal solution containing colloidal substances, comprising:
    providing a first filter in the colloidal solution;
    adding a additive to the colloidal solution so that the colloidal substances are coagulated in the colloidal solution and that the coagulated colloidal substances are not large enough to generate flocks which sediment;

sucking the colloidal solution through the first filter so that the coagulated colloidal substances are accumulated on a surface of the first filter to form a gel membrane;

sucking the colloidal solution through the gel membrane as a second filter formed on the first filter until the second filter clogs so that a thickness of the gel membrane increases as the coagulated colloidal substances are added to the gel membrane;

removing at least a part of the clogged second filter; and repeating the adding, the sucking to form the gel membrane and the sucking through the gel membrane.

13. The filtering method of claim 12, wherein the additive comprises a coagulant or a pH adjuster.

14. The filtering method of claim 13, wherein the coagulant comprises aluminum chloride or aluminum sulfate.

15. The filtering method of claim 13, wherein the pH adjuster comprises hydrogen chloride or sodium hydroxide.

16. The filtering method of any one of claims 12, 13, 14 and 15, wherein the sucking of the colloidal solution to form the gel membrane comprises applying a suction pressure to the first filter so that a filtration rate during the formation of the second filter is approximately equal to a filtration rate during the sucking using the second filter.

17. The filtering method of any one of claims 12, 13, 14 and 15, wherein the sucking of the colloidal solution using the second filter comprises applying a low suction pressure to the first filter so that a filtration rate is maintained during the sucking.

18. The filtering method of any one of claims 12, 13, 14 and 15, wherein the sucking of the colloidal solution to form the gel membrane is performed under a suction pressure and the sucking of the colloidal solution using the second film is performed under the same suction pressure as the sucking of the colloidal solution to form the gel membrane.

19. The filtering method of any one of claims 12, 13, 14 and 15, wherein the sucking of the colloidal solution using the second filter comprises applying a low pressure to the second filter so as to maintain a filtration rate of the second filter within a proper range for an extended period.

20. The filtering method of any one of claims 12, 13, 14 and 15, further comprising introducing air bubbles along a surface of the second filter.

21. The filtering method of claim 20, wherein the air bubbles are introduced from the entire bottom edge of the second filter.

22. The filtering method of any one of claims 12, 13, 14 and 15, wherein the clogging of the second filter corresponds to an onset of a decrease in a filtration rate during the sucking through the gel membrane.

23. The filtering method of any one of claims 12, 13, 14 and 15, wherein the sucking of the colloidal solution using the second filter comprises applying a suction pressure to the first filter, and the suction pressure is not applied to the first filter during the removing of the second filter.

24. The filtering method of claim 20, wherein more air bubbles are introduced during the removing of the second filter than during the sucking using the second filter.

25. The filtering method of any one of claims 12, 13, 14 and 15, wherein the removing of the second filter comprises applying a reverse pressure to the first filter so that a flow of the colloidal solution is reversed.

26. The filtering method of any one of claims 12, 13, 14 and 15, wherein the colloidal solution comprises a CMP slurry.

27. The filtering method of any one of claims 12, 13, 14 and 15, wherein apart of the colloidal substances is debris formed during a CMP process.

28. A method of filtering a CMP slurry containing colloidal substances and an ammonium compound, comprising:

providing a first filter in the colloidal solution;

adding hypochlorous acid or sodium hypochlorite to the CMP slurry so as to decompose the ammonium compound and to change pH of the CMP slurry;

sucking the CMP slurry through the first filter so that coagulated colloidal substances are accumulated on a surface of the first filter to form a gel membrane; and sucking the CMP slurry through the gel membrane as a second filter formed on the first filter so that a thickness of the gel membrane increases as the coagulated colloidal substances are added to the gel membrane, wherein the changing of the pH of the CMP slurry is such that the coagulated colloidal substances are not large enough to generate flocks which sediment.

29. The filtering method of claim 28, further comprising generating the hypochlorous acid by electrolysis of a water solution of sodium chloride.

* * * * *